Nov. 28, 1944. P. S. WARRINER 2,363,820
APPARATUS FOR THE AUTOMATIC PROJECTION OF PHOTOGRAPHIC
TRANSPARENCIES AND THE LIKE
Original Filed Aug. 3, 1940  2 Sheets-Sheet 1
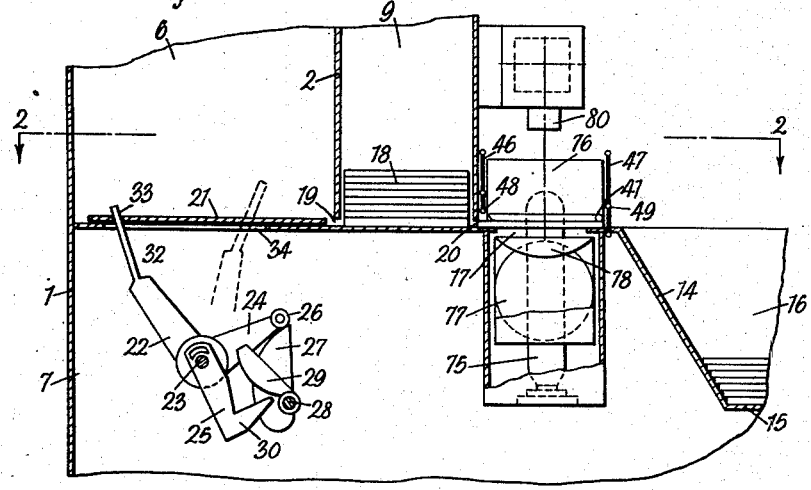
Fig.1
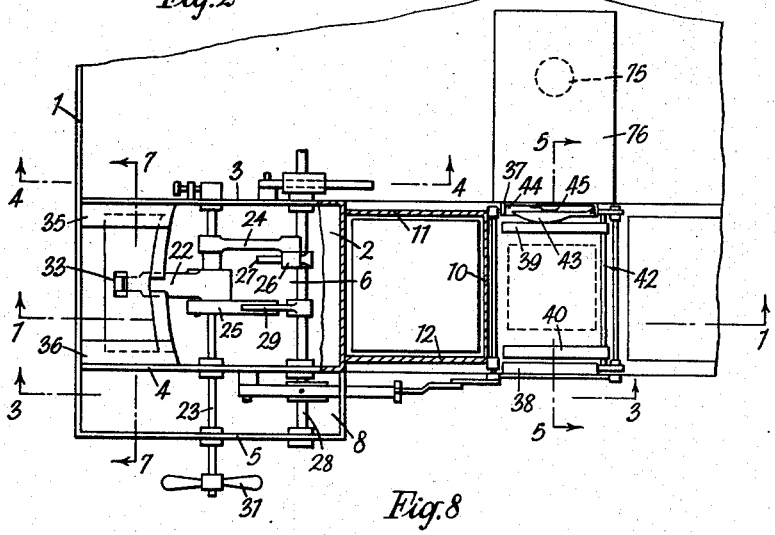
Fig.2
Fig.8
INVENTOR
Percy S. Warriner,
By:- Smith, Michael & Gardiner, Attys.

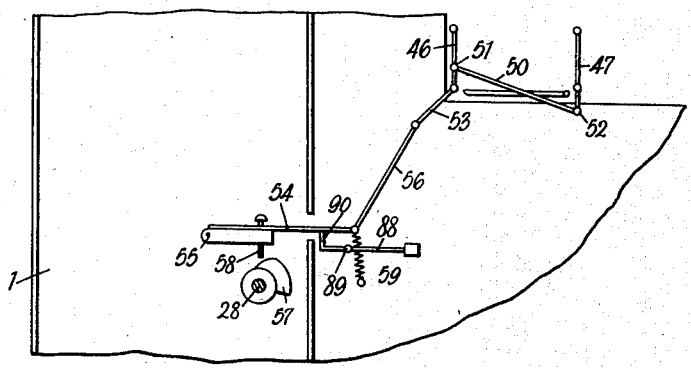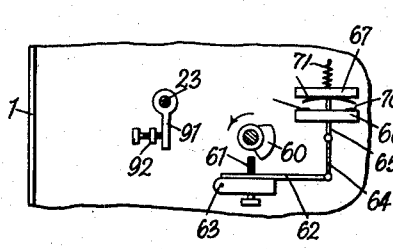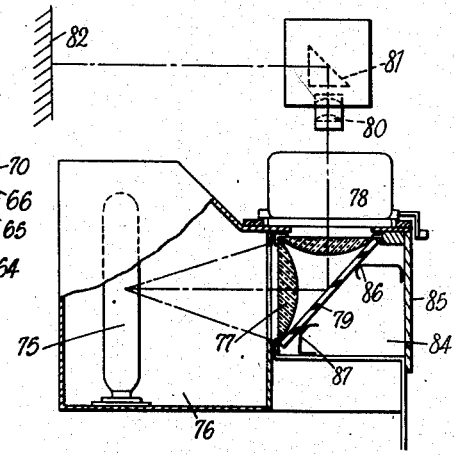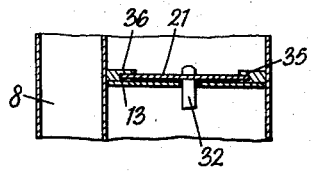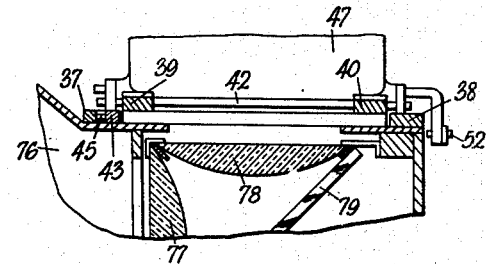

Patented Nov. 28, 1944

2,363,820

UNITED STATES PATENT OFFICE 2,363,820

APPARATUS FOR THE AUTOMATIC PROJECTION OF PHOTOGRAPHIC TRANSPARENCIES AND THE LIKE

Percy Stuart Warriner, Doncaster, England

Original application August 3, 1940, Serial No. 350,968. Divided and this application June 18, 1941, Serial No. 398,664. In Great Britain June 10, 1940

12 Claims. (Cl. 88—28)

This invention relates to automatic power driven continuously operable projectors for the production of photographic transparencies and the like, hereinafter referred to as "slides." This application is a division of my application Serial No. 350,968 filed August 3, 1940.

According to the invention, such a projector comprises in combination, a slide magazine to contain a supply of slides to be shown; a projection aperture; a mechanism operative to eject the slides from the magazine one by one and to place them in showing position over the projection aperture; a motor for driving the ejecting mechanism; a manual means for operating the ejecting mechanism; and an operative connection between the motor on the one hand and the manual means on the other and the ejecting mechanism, of a kind to permit the manual means to be operated when the motor is at rest, without disconnection of the motor and without transmission of torque thereto.

In this way a construction is provided which while being exceedingly simple and efficient is at the same time advantageous in that it is capable of operation either by hand or by means of the motor, for example in the event of the current supply to the motor (assuming the latter is an electric motor, as it usually will be) failing or for some other reason it should become impossible or undesirable to use the motor.

More particularly, the invention comprises in a projector as above set forth the combination of a slide magazine to contain a supply of slides to be shown; a projection aperture; a mechanism operative to eject the slides from the magazine one by one and to place them in showing position over the projection aperture; a continuously running motor for driving the ejecting mechanism; an intermittent-drive operative connection between the motor and the ejecting mechanism, which includes two members in driving relationship to one another, the driving member of which, although continuously movable with the motor, is in engagement with the driven member for only a portion of the total path of movement of the driving member per combined period of slide-showing and slide-change, the driven member being free for movement with the ejecting mechanism independently of the driving member when the motor is not in operation and the driving member is at a position in its path of movement of disengagement from the driven member; and a manual means for operating the driven member and therewith the ejecting mechanism when the motor is not in operation and the driving member is in said position of disengagement from the driven member.

According to a convenient and preferred form of the invention, the intermittent-drive operative connection between the motor and the ejecting mechanism includes two members in driving relationship to one another, the driving member of which comprises a pair of oppositely acting rotary cams which have a common axis of rotation and revolve continuously and as one so long as the motor is operating and the driven member comprises a co-operating pair of arms which are oscillatable together and as one about a common axis of rotation and are respectively and in succession engaged by the cams, the arrangement being such that during a portion of each complete revolution of the cams the latter are in positive driving engagement with the arms first in a direction to move them through one of their strokes of reciprocation and then in the opposite direction and during the remainder of said revolution the cams move clear of the path of the arms, and the arrangement further being such that the manual means are connected to the arms, which therefore are arranged to be oscillated by manipulation of the manual means, that is to say, when the motor is not in operation and the cams are occupying a position in their path of rotation in which they are clear of the path of oscillation of the arms.

Such a construction is simple and represents in practice a highly satisfactory form of mechanism for the general purposes of the invention.

In this regard, it may be remarked that by providing for positive driving engagement in both directions as between the driving and driven members of the operative connection, certainty of action is ensured of the slide ejector mechanism, which certainty of action is not easy or always possible to obtain with the use of a one-way positive drive operating against a spring to effect the return stroke of the mechanism. This is more especially the case when as in the particular embodiment of the invention hereinafter described, the slides descend the magazine by gravity and leave it by way of an exit passage at the bottom of the magazine, as in that case the whole weight of the pile of slides in the magazine is resting on the pusher plate or equivalent part of the ejector mechanism during the return stroke thereof and in consequence considerable resistance is presented to its movement in said return stroke, which resistance, moreover, will vary with the number of slides in the pile, which again may vary considerably in the actual use of the apparatus.

Moreover, with the use of a construction such as that referred to, there is the further advantage that it provides in a very simple way for a high ratio of slide-showing period to slide-change period to be catered for in the design of the machine, since, again as in the particular embodiment of the invention hereinafter described, the pusher plate (or equivalent part) can be operatively connected to the rock shaft through the intermediary of an arm thereon engaging the pusher plate at the free end and such an arm can be of practically any necessary length, having regard to the angular length of free (disengaged) rotation of the cams relatively to a complete rotation thereof, to give the desired ratio of slide-showing period to slide-change period in the operation of the machine.

According to a further feature of the invention, the desired high ratio of slide-showing period to slide-change period may also or further be provided for by arranging that the motor shall run at a higher rate of speed during the slide-change periods than during the slide-showing periods, the motor being provided for this purpose with a two-speed control which is automatically operated by a control member driven by the motor in synchronism with the slide ejecting mechanism.

The invention includes other useful and novel features, as will be apparent from the following description of a preferred embodiment of the invention with reference to the accompanying drawings.

In the drawings,

Figure 1 is a vertical section through a part of a slide projection apparatus constructed in accordance with the invention, the section being taken on the section line 1—1 of Figure 2;

Figure 2 is a horizontal section through the apparatus shown in Figure 1, on the section line 2—2 of that figure;

Figure 3 is a fragmentary vertical section through the apparatus shown in Figures 1 and 2, taken on the section line 3—3 of Figure 2;

Figure 4 is a fragmentary vertical section through the same apparatus, on the section line 4—4 of Figure 2;

Figure 5 is a fragmentary vertical section at right angles to the planes of the sections of Figures 3 and 4, on the section line 5—5 of Figure 2;

Figure 6 is a fragmentary vertical section also on the section line 5—5 of Figure 2 through the projection aperture of the apparatus and the parts in the immediate vicinity thereof, the section being drawn on a larger scale than Figure 5;

Figure 7 is a fragmentary vertical section through the apparatus on the section line 7—7 of Figure 2, and Figure 8 is a wiring diagram hereinafter more particularly described.

Like reference numerals indicate like parts in the various figures.

Referring to the drawings, the slide projection apparatus there shown comprises a framework generally enclosing the moving parts of the apparatus. This framework includes inter alia a transverse wall 1, a second transverse wall 2 and three longitudinal walls 3, 4, 5. The walls 2, 3, 4 enclose with a part of the wall 1 a compartment 6 below which is another compartment 7. Abreast the compartments 6, 7 is a third compartment 8 bounded by the walls 4, 5, a part of the wall 2 where this extends beyond the plane of the wall 4 and a part of the wall 1. Adjacent the compartment 6 is a vertical slide magazine 9 bounded by the part of the wall 2 which bounds the compartment 6, a wall 10 opposite said part of the wall 2 and two walls 11, 12 at right angles thereto. Bounding the compartment 6 and forming the floor of the magazine 9 is a horizontal wall 13 which extends from the wall 1 to the upper edge of an inclined wall 14 forming with a horizontal wall 15 and continuations of the walls 3, 4 beyond the line of the wall 14 a reception chamber 16 for the shown slides. In the wall 13 at a position adjacent the magazine 9 and to the right thereof in Figure 1 is a projection aperture 17.

The slide magazine 9 is arranged to accommodate a pile of slides 18 one upon the other, and with the plane of the slides horizontal. At the bottom of the portion of the wall 2 which bounds the magazine on the left-hand side (in Figure 1) thereof is a slot 19 extending for the full width of the magazine and constituting an exit passage for the slides therefrom. At the bottom of the wall 10 is a similar slot 20. The width of these slots 19, 20 in the vertical direction slightly exceeds the thickness of a single slide and the bottom of the slot is flush with the upper surface of the wall 13, which, as above remarked, forms the floor of the magazine. The lowermost slide of the pile can, therefore, be pushed through the slot 20 into showing position over the projection aperture 17 by a movement in its own plane, with retention, however, of all of the rest of the slides above it in the magazine.

The means for moving the slides from the magazine comprises a horizontal pusher plate 21 which is reciprocable in its own plane, which, as appears from the figures, is parallel to that of the wall 13. The pusher plate 21 is shown in the figures in its withdrawn or rearward position, that is, in the position it occupies immediately prior to the commencement of a forward stroke. Its leading edge is, therefore, just about to enter the slot 19 and the lowermost slide of the pile of slides in the magazine is, as shown, resting on the floor of the magazine in readiness to be pushed out of the magazine through the slot 20 during the operative or forward stroke of the pusher plate.

The pusher plate 21 is reciprocated by an oscillating arm 22, with the interposition between each reciprocation and the next of a dwell (slide-showing) period in which it remains stationary. The arm 22 is fast with a horizontal rock shaft 23 with which is also fast a second arm 24 and adjustably fast a third arm 25. On the free end of the arm 24 is a roller 26 forming the follower of a cam 27 fast with a second horizontal shaft 28. Also fast on the shaft 28 is a second cam 29 which coacts with a finger 30 projecting laterally from the arm 25. The arrangement is such that as the shaft 28 rotates, the rock shaft 23 is oscillated, this due to the action of the cams 27, 29 coacting respectively with the roller 26 and the finger 30. The shaft 28 is continuously driven by an electric motor 28a (see Figure 8). As stated, the arm 25 is adjustably fast with the shaft 23. This is for the purpose of effecting a fine adjustment of the angular position of the arm 25 and thereby of the throw of the arm 22. The parts 22, 24, 25, 26, 27, 29 and 30 are all positioned as shown, within the compartment 6, the shaft 28 extending, however, not only through this compartment 6 but also through the compartment 8 adjacent thereto. The shaft 23 also extends not only through the compartment 6 but also through the compartment 8 to a position beyond the outer wall 5 thereof where there is affixed to the shaft a handle 31 for manual operation of the apparatus when required.

The arm 22 has a reduced portion 32 at the free end of the arm and this reduced portion 32 works in a fulcrum slot 33 provided to receive it in the rear end of the pusher plate 21. The wall 13, in order to accommodate the said reduced portion 32 of the arm 22 as the arm oscillates, that is, from the full-line position of Figure 1 to the dotted-line position therein, is formed with a slot 34 as shown clearly in Figure 7 and the pusher plate 21 is guided in its reciprocatory movement by a pair of guides 35, 36 secured to the upper side of the wall 13.

During its movement into position over the projection aperture 17 through the slot 20, the slide in course of ejection from the slide magazine by the forward stroke of the pusher plate 21, is guided between a pair of guide bars 37, 38 affixed to the upper face of the wall 13, the said guide bars 37, 38 being positioned as shown, abreast the projection aperture and the distance between them being such that the slide has a free sliding fit to and from showing position over the aperture. These guide bars, together with the wall 13 form what is in effect a track for the slides.

In order that the slide shall be held perfectly still when in showing position over the projection aperture, a pair of presser bars 39, 40 are provided which are mounted at 41 on a hinge rod 42 to swing in vertical planes about the axis of the hinge rod and so by their weight bear downwardly upon the marginal portions beneath them of the slide in position over the projection aperture, thereby holding the slide stationary in the showing position. The free end of the presser bars 39, 40, that is, the end thereof remote from the hinge rod 42 is chamfered on the underside as shown in Figure 1, to facilitate the entrance of the leading edge of the moving slide as this is pushed to the showing position from the bottom of the magazine. The slide in the showing position is further prevented from movement relatively to the projection aperture once it has been placed thereover, by a laterally disposed presser lever 43 accommodated in a recess 44 provided to receive it in the guide bar 37, the presser lever 43 being pressed by a spring 45 in the direction to engage it with the edge of the slide in position over the projection aperture, thereby pressing the slide lightly against the opposing edge of the opposite guide bar 38.

The arrangement is such, as will be understood from what has been so far described of the apparatus, that at each throw of the arm 22 of the slide ejecting mechanism, a slide is ejected from the showing position over the projection aperture into the reception chamber 16 and another is pushed into the showing position from the bottom of the magazine, the pile of slides remaining in the magazine descending therein to the floor of the magazine following the completion of withdrawal of the pusher plate 21 therefrom in the backward or return stroke of the arm 22.

It will also be understood that in accordance with a feature of the apparatus already pointed out, the operative connection which is provided as between the motor and the pusher plate 21 is such as to give a positive drive to the plate in both directions of reciprocation thereof, with the advantage hereinbefore set forth in respect of this feature.

Associated with the projection aperture are a pair of hinged flaps 46, 47 which form a shutter to obturate the aperture during the periods of slide change. These flaps are hinged respectively at 48 and 49. During the periods of slide change they occupy horizontal positions in which they completely close the aperture against the passage of light therethrough. During the intervening slide-showing periods they occupy the vertical positions in which they appear in Figure 1. In order that they shall move together they are interconnected by a connecting rod 50 pivoted at 51 to the flap 46 and at 52 to the flap 47. The flaps 46, 47 are arranged to operate automatically and in time with the slide ejecting mechanism. For this purpose they are operatively connected to the shaft 28 where this extends, as above described, through the compartment 8. The operative connection comprises a crank 53 fast with the flap 46 so as to swing therewith about the pivotal axis of the flap, a resilient arm 54 pivoted at 55 to the wall 4 of the framework of the apparatus, a connecting rod 56 pivotally connected at one end to the crank 53 and at the other end to the arm 54, a cam 57 fast with the shaft 28 and a projection 58 on the arm 54, the projection 58 forming a follower member relatively to the cam 57 and the various parts enumerated of the operative connection being held in the flap-open positions in which they appear in Figure 3 by a tension spring 59 always urging them to these positions. The arrangement, therefore, is one according to which the spring 59 maintains the flaps in the open position while the flaps are moved to the closed position by the action of the cam 57 coacting with the projection 58 on the arm 54, the cam 57 working, therefore, against the pull of the spring 59. The projection 58 is adjustable in its position in the arm 54 with respect to the path of the cam 57 and the parts are so proportioned that the cam 57 first operates to bring the flaps down to closed position, in which position they abut at their lateral edges the upper surface of the presser bars 39, 40, and then upon continued rotation bend the resilient arm 54 against the reaction of the presser bars transmitted to it through the flaps and the parts of the operative connection between the flaps and the free end of the arm 54 and so applies through the flaps and said parts of the operative connection a yielding downward pressure upon the presser bars 39, 40 and through the intermediary of these, upon the slide as it is being pushed into position over the projection aperture. In this way, a braking action is applied to the movement of the slide which ensures that it shall not be overshot past the aperture.

The electric motor which drives the shaft 28 is arranged to be run at a higher rate of speed during the slide-change periods than through the intervening (slide-showing) periods. For this purpose, an automatic two-speed control for the motor is provided. The parts forming this control comprise a cam 60 (Figure 4) fast on the shaft 28. The cam 60 coacts with a projection 61 on an arm 62 pivoted at 63 to the wall 3. The arm 62 is pivotally connected at the face end to a rod 64 which in turn is pivotally connected to a rod 65 extending freely through a contact block 66 to a second contact block 67 above it. The contact block 67 is normally urged in a direction away from the contact block 66 so as to separate a contact 68 on the block 67 from a co-operating pair of contacts 69, 70 on the block 66, by a spring 71 and the cam 60 operates as it rotates to draw the block 67 towards the block 66 and thereby close the circuit through the contacts 68, 69, 70, the diagram of which circuit is shown in Figure 8. The arrangement is such that just before the commencement of a slide change period, the switch constituted by the contacts 68, 69, 70 is closed by the cam. This short-circuits a controller resistance 72 in the motor circuit and so effects a speeding-up of the motor. The higher speed of the motor continues until termination of the slide change period, when the switch 68, 69, 70 opens and again throws in the resistance 72 into the motor circuit, so restoring the speed of the motor to a lower value, which continues to the commencement of the next slide-change period, that is, through the ensuing slide-showing period. If desired, an arrangement can be used according to which the rod 64 (or some equivalent part) operates a centrifugal governor geared to the motor.

Referring now to the optical part of the apparatus, the source of light employed is a vertical projection lamp 75 of standard type. This lamp is enclosed in a lamp housing 76 in front of which is a condenser assembly consisting of two lenses 77, 78 disposed at right angles to one another as shown in Figure 5 and a mirror 79 disposed at 45° to the lenses 77, 78. The arrangement is such that the light entering the lens 77 strokes the mirror 79 and is deflected upwardly thereby through the lens 78 to a projection lens 80 from which the beam passes to a reversing prism 81 and thence horizontally to the screen 82 on to which the slide is being projected. The lamp 75 may, as in the arrangement illustrated in Figure 8, be included in a circuit forming an extension of the motor control circuit, said extension including a lamp switch 83 as shown.

The lenses 77, 78 and the mirror 79 are assembled in a box 84 contiguous to the lamp housing 76 and situated, as shown, immediately below the projection aperture 17. Conveniently, a front wall 85 of this box 84 is removable to give access to the interior of the box and the arrangement is such that when the wall 85 is in position it holds the mirror 78 and the two lenses 77, 78 in position by the abutment against the back of the mirror of a resilient bearing member 86 affixed to the back of the wall 85 and a cooperating resilient bearing member 87 affixed to the bottom wall of the box.

It will be observed that the diverging (horizontal) lens 78 is positioned very near the projection aperture 17. This, coupled with the arrangement of the lenses in the manner described with a deflecting mirror optically between them, ensures that a maximum quantity of light shall pass through the condenser assembly for a given size of lens used therein, or otherwise expressed, that for a given requisite intensity of light beam thrown upwardly through the projection aperture a minimum size of lens shall be required in the condenser assembly. Thus, with the parts of the condenser assembly arranged as shown, the distance on the one hand between the collecting lens 77 and the light source and the distance on the other between the diverging lens 78 and the aperture, are both reduced to a minimum. In addition, the arrangement referred to lends itself to compactness of design of the optical system as a whole.

In accordance with the invention as earlier set forth herein, the apparatus may be operated by hand, for example for purposes of starting up or in the event of the source of power failing, without disconnection of the power means and without the transmission of any torque to the motor which normally operates the apparatus. Thus, by oscillating the handle 31, that is to say, with the rock shaft 28 turned to a position in which the cams 27, 29 thereon are clear of the path of the arms 24, 25 on the shaft 23, the slide ejecting mechanism is actuated, while to operate the shutter flaps by hand a hand lever 88 (Figure 3) is provided which is pivoted at 89 to the wall 4 and is situated in the compartment 8. This lever is formed with a finger 90 which when the lever is depressed bears on the arm 54 and lifts it to close the shutter flaps in the manner above described.

In order to limit the movement of the handle 31, adjustable stop means are provided, comprising a lever 91 (Figures 2 and 4) fast on the shaft 23 and a corresponding screw abutment 92 on the wall 3.

As shown, the shafts 23 and 28 are supported in bearings in the walls 3, 4, 5.

It will be appreciated that excessive pressure of the shutter flaps on the presser bars 39, 40 such as might cause jamming due to the additional load on the cam 57 is prevented by the resilient nature of the arm 54, while the pressure of the shutter flaps on the bars is adjustable to a nicety by adjustment of the screw 58.

The relative angular positions of the cams 29 and 57 on the shaft 28 are such that the shutter flaps close immediately prior to the pusher plate 21 commencing its operative stroke and the form of the cams is such that the shutter flaps open again immediately upon termination of this stroke of the pusher plate.

The invention is capable of considerable variation in respect of constructional details such, for example, as the form of the slide ejecting and shutter operating mechanisms and of the operative connection that is provided as between these mechanisms and the motor on the one hand and the manual operating means on the other; all such variations are to be understood to be within the scope of the invention as delineated in the following statement of claim.

What I claim as my invention and desire to secure by Letters Patent of the United States is:

1. An automatic power-driven continuously operable slide projector comprising a slide magazine; a projection aperture; a slide ejecting mechanism operative to eject the slides from the magazine one by one and to place them in showing position over the projection aperture; a continuously running motor for driving the slide ejecting mechanism; an operative connection between the motor and the slide ejecting mechanism, which operative connection includes a driving member continuously driven by the motor and performing one cycle of operative movement per slide change in the operation of the projector and a driven member only intermittently driven by the driving member, being engaged thereby with consequent performance of an operative movement during a portion only of each cycle of operative movement of the driving member and remaining stationary during the remaining portion of said cycle, the said driven member being operatively connected to the slide ejecting mechanism so as when operated to operate the mechanism and having freedom for movement with consequent operation of the mechanism when the driving member is out of engagement with it; and a manual operating means for the slide ejecting mechanism, comprising an operating member connected to the aforesaid driven member otherwise than through the aforesaid driving member, an arrangement being thereby provided in which the ejecting mechanism is operable by hand when required without disconnection of the motor.

2. An automatic power driven continuously operable slide projector as specified in claim 1, wherein the motor is arranged to run at a higher rate of speed during the slide-change periods than during the slide-showing periods, being provided for this purpose with a two-speed control which is automatically operated by a control member driven by the motor in synchronism with the slide ejecting mechanism.

3. A slide projector as specified in claim 1, wherein the slide magazine is vertically disposed, the slides when in position therein being accommodated in a pile with their planes horizontal; the slide that is ejected from the magazine at each operation of the ejecting mechanism is the lowermost slide of the pile; the ejecting mechanism includes a pusher member that reciprocates once at each operation of the mechanism and in doing so, pushes the said lowermost slide out of the magazine, the pusher member reciprocating thus against the weight upon it of the pile of slides above the said lowermost slide; and the operative connections through the intermediary of the driving and driven members referred to in said claim 1, between the motor on the one hand and the operating member of the manual operating means on the other and the pusher member of the ejecting mechanism are sufficiently positive (non-elastic) to be non-yielding to the pressure of the pile of slides on the pusher member as this performs its reciprocations.

4. A slide projector as specified in claim 1, wherein the motor is operatively connected to the slide ejecting mechanism through the intermediary of a transmission shaft and a two-speed control device automatically operative under the control of the motor and in synchronism with the movements of the ejecting mechanism is provided to effect a speeding up of the transmission shaft during the periods of slide changing as compared with the speed of the shaft during the slide showing periods.

5. An automatic power driven continuously operable slide projector comprising, in combination, a slide magazine to contain a supply of slides to be shown; a projection aperture; a mechanism operative to eject the slides from the magazine one by one and to place them in showing position over the projection aperture; shutter means automatically operative in time with the ejecting mechanism to close the projection aperture during the periods of slide-change; a motor for driving the ejecting mechanism and the shutter means; a manual means for operating the ejecting mechanism; a manual means for operating the shutter means; and an operative connection between the motor on the one hand and the two manual means on the other and the ejecting mechanism and the shutter means, of a kind to permit the two manual means to be operated when the motor is at rest, without disconnection of the motor and without transmission of torque thereto.

6. A slide projector as specified in claim 5, wherein the operative connection as between the motor and the shutter means includes a cam driven by the motor and an associated cam follower operatively connected to the shutter means and the manual means for operating the shutter means are connected to the cam follower, the arrangement being such thereby that by manipulation of the said manual means the cam follower can be moved in a sense to operate the shutter means when the motor and therefore the cam is at rest and without transmission of torque to the motor through the cam.

7. An automatic power-driven continuously operable slide projector comprising a slide magazine; a projection aperture; a slide ejecting mechanism operative to eject the slides from the magazine one by one and to place them in showing position over the projection apertures; a continuously running motor for driving the slide ejecting mechanism; an operative connection between the motor and the slide ejecting mechanism, which operative connection includes a rotatable driving member continuously driven by the motor and an oscillatable driven member only intermittently driven by the driving member, being engaged thereby with consequent performance of an oscillation during a portion only of each revolution of the member and remaining stationary during the remaining portion of the revolution, the said driven member being operatively connected to the slide-ejecting mechanism so as when oscillated to operate the mechanism and having freedom for movement with consequent operation of the mechanism when the driving member is out of engagement with it; and a manual operating means for the slide-ejecting mechanism, comprising an operating member connected to the aforesaid driven member otherwise than through the aforesaid driving member, an arrangement being thereby provided in which the ejecting mechanism is operable by hand when required without disconnection of the motor.

8. A slide projector as specified in claim 7, wherein the driving member of the operative connection between the motor and the slide-ejecting mechanism consists of a pair of oppositely acting rotary cams having a common axis of rotation and rotatable thereabout as one and the driven member of said operative connection consists of a co-operating pair of rocker arms which are oscillatable as one about a common axis of oscillation and are respectively and in succession engaged by the cams with consequent movement to and fro under positive thrust from the cams in both directions.

9. A slide projector as specified in claim 7, wherein the slide magazine is vertically disposed, the slides when in position therein being accommodated in a pile with their planes horizontal; the slide that is ejected from the magazine at each operation of the ejecting mechanism is the lowermost slide in the pile; the ejector mechanism includes a pusher member that reciprocates once at each operation of the mechanism and in doing so pushes the said lowermost slide out of the magazine, the pusher member reciprocating thus against the weight upon it of the pile of slides above the said lowermost slide; the driving member of the operative connection between the motor and the ejecting mechanism consists of a pair of oppositely acting rotary cams having a common axis of rotation and rotatable thereabout as one; the driven member of said operative connection consists of a co-operating pair of rocker arms which are oscillatable as one about a common axis of oscillation and are respectively and in succession engaged by the cams with consequent movement to and fro under positive thrust from the cams in both directions; and the driven member on the one hand and the driving member on the other are connected, the one to the motor and the other to the pusher plate, through driving connections which are sufficiently positive (non-elastic) to be non-yielding to the pressure of the pile of slides on the pusher member as this reciprocates.

10. A slide projector as specified in claim 7, wherein the slide magazine is vertically disposed, the slides when in position therein being accommodated in a pile with their planes horizontal; the slide that is ejected from the magazine at each operation of the ejecting mechanism is the lowermost slide in the pile; the ejector mechanism includes a pusher member that reciprocates once at each operation of the mechanism and in doing so pushes the said lowermost slide out of the magazine, the pusher member reciprocating thus against the weight upon it of the pile of slides above the said lowermost slide; the driving member of the operative connection between the motor and the ejecting mechanism consists of a pair of oppositely acting rotary cams having a common axis of rotation and rotatable thereabout as one; the driven member of said operative connection consists of a co-operating pair of rocker arms which are oscillatable as one about a common axis of oscillation and are respectively and in succession engaged by the cams with consequent movement to and fro under positive thrust from the cams in both directions; and the driven member on the one hand and the driving member on the other are connected, the one to the motor and the other to the pusher plate, through driving connections which are sufficiently positive (non-elastic) to be non-yielding to the pressure of the pile of slides on the pusher member as this reciprocates, the driven member being connected also to the operating member of the manual operating means through such a driving connection.

11. A slide projector as specified in claim 7, wherein the slide magazine is vertically disposed, the slides when in position therein being accommodated in a pile with their planes horizontal; the slide that is ejected from the magazine at each operation of the ejecting mechanism is the lowermost slide of the pile; the ejector mechanism comprises a pusher member that reciprocates once at each operation of the mechanism and in doing so pushes the said lowermost slide out of the magazine, the pusher member reciprocating thus against the weight upon it of the pile of slides above said lowermost slide; and an arm carried on a rock shaft that is oscillatable with the arm and at the free end engages the pusher member for movement thereof in both directions of movement of the arm; the driving member of the operative connection between the motor and the ejecting mechanism consists of a pair of oppositely acting rotary cams having a common axis of rotation and rotatable thereabout as one; the driven member of said operative connection consists of a co-operating pair of rocker arms which are carried upon the rock shaft, fast therewith, and are respectively and in succession engaged by the cams with consequent movement to and fro under positive thrust from the cams in both directions; the cams are connected to the motor through a driving connection which is sufficiently positive (non-elastic) to be non-yielding to the pressure of the pile of slides on the pusher plate as this reciprocates; and the operating member of the manual operating means is similarly connected to the rock shaft through such a driving connection.

12. A slide projector as specified in claim 7, wherein the driving member of the operative connection between the motor and the slide-ejecting mechanism consists of a pair of oppositely acting rotary cams having a common axis of rotation and rotatable thereabout as one; the driven member of said operative connection consists of a co-operating pair of rocker arms which are oscillatable as one about a common axis of oscillation and are respectively and in succession engaged by the cams with consequent movement to and fro under positive thrust from the cams in both directions, and means are provided for effecting a fine adjustment of the relative angular position of the arms about the axis of oscillation thereof.

P. S. WARRINER.